United States Patent [19]
Iannuzzi et al.

[11] Patent Number: 5,576,581
[45] Date of Patent: Nov. 19, 1996

[54] DOOR CONTROL SYSTEM AND RELEASE MECHANISM

[75] Inventors: Nelson A. Iannuzzi; George M. Mehalshick, both of Hazleton, Pa.

[73] Assignee: Solid State Securities, Inc., Hazleton, Pa.

[21] Appl. No.: 153,590

[22] Filed: Nov. 17, 1993

[51] Int. Cl.⁶ .................................................. H01H 37/00
[52] U.S. Cl. .............................. 307/117; 307/39; 307/60; 307/64; 160/7; 160/133; 160/310; 74/2
[58] Field of Search .................................. 307/39, 60, 64, 307/117; 160/133, 7, 310; 74/2

[56] References Cited

U.S. PATENT DOCUMENTS

| | | | |
|---|---|---|---|
| 3,955,840 | 5/1976 | Rawls et al. | 292/229 |
| 4,120,340 | 10/1978 | Stascavage et al. | 160/133 |
| 4,386,645 | 6/1983 | Dever et al. | 160/183 |
| 5,082,316 | 1/1992 | Wardlaw. | |
| 5,272,385 | 12/1993 | Cravero | 307/116 |
| 5,278,454 | 1/1994 | Strauss et al. | 307/64 |

OTHER PUBLICATIONS

Cornell Iron Works product brochure (1993).
Cornell Iron Works, Inc. Follow–Up Service Procedure (Type R) Releasing Devices manual, vol. 1 (Revised).
Cornell M581 Fire Door Release Model D manual, vol. 1 (1974).
Cornell M58A Fire Door Release Model E manual, vol. 1 (1974).
Cornell Iron Works, Inc. Follow–Up Service Procedure (Type R) Releasing Devices manual, vol. 2 (1992).
Instruction Manual for Cornell Releasing Device M58A (1991).

*Primary Examiner*—William M. Shoop, Jr.
*Assistant Examiner*—Albert W. Paladini
*Attorney, Agent, or Firm*—Duane, Morris & Heckscher

[57] ABSTRACT

Fire control systems and release mechanisms. The release mechanisms of the present invention comprise a digital logic circuit for processing signals which are indicative of a condition in an outside environment, and for providing a trigger that will actuate the mechanical release mechanism in response to the condition, a power circuit for providing regulated power to the electronic circuit in response to the input power, the regulated power being used to operate the digital logic circuit, and a power backup circuit interfaced to the power circuit for providing the regulated power for a predetermined time in the event of an input power failure so that the digital logic circuit can be operated for the predetermined time during the input power failure.

8 Claims, 9 Drawing Sheets

DOOR CONTROL SYSTEM AND RELEASE MECHANISM

FIELD OF THE INVENTION

This invention relates generally to door control safety systems, and more particularly, to release mechanisms used in conjunction with rolling doors to ensure a safe environment in the event of a catastrophe.

BACKGROUND OF THE INVENTION

Fire doors have long been used for providing safety mechanisms to protect an environment were an event such as the actuation of a fire alarm or smoke detector occurs. Systems which utilize fire doors generally receive their operating power from the electrical system of a building. When an alarm event occurs or the operating power is lost, a release mechanism interfaced to the fire door causes the fire door to close, thereby protecting the environment from the fire condition and smoke.

A fire door system usually comprises a rolling fire door assembly that includes a rolling fire door mounted on a horizontally extending axle for movement of the door between the raised (and lowered) positions. See, for example, U.S. Pat. No. 5,082,316, Wardlaw, at column 2, lines 17–28, the teachings of which are specifically incorporated herein by reference.

In these systems, the fire door is maintained in the raised position by a release mechanism which is mounted on the wall above the door. Release mechanisms are connected to release levers through a chain so that the release lever is held in locking engagement when the chain is in tension. The chain normally comprises a fusible link which is adapted to melt and thereby release the door in response to the heat produced by a fire.

There are many types of release mechanisms known in the art, examples of which are disclosed in the Wardlaw patent referenced above. Generally, a release mechanism and its associated detection system may be adjusted to compensate for more or less severe ambient temperature changes by different settings of the release mechanism, or by varying the size of compensating vents in the system to increase or decrease the rate of pressure buildup caused by a sudden temperature rise. Such release mechanisms may also be "time-delay release devices" in that they only release the fire door to close during emergency conditions after a predetermined time delay which is initiated after receiving data about an emergency condition, or after losing operating power.

Prior release devices have also generally used solenoids to interface with the temperature fuse link system and chain which drives the rolling fire door. The solenoids actuate the chain during the alarm or power loss condition. The release devices are termed "fail safe" when the solenoid operates or when the operating power to the system is lost.

However, the prior release mechanisms known in the art have not possessed the ability to operate for a period of time to sense an alarm condition when operating power is lost. This has resulted in fire doors being closed only on the condition when operating power is lost but when no fire or other emergency event is detected. Thus when power is interrupted to the release device in response to some non-catastrophic or non-fire condition, it is generally not necessary for the rolling door to close. The prior rolling doors and release mechanisms have automatically closed in this situation, thereby presenting potential dangers to individuals who might be trapped in a building without power, and further requiring resetting of the fire control system. The rolling fire door art has not heretofore devised a solution to these problems.

SUMMARY OF THE INVENTION

The aforementioned problems are overcome by electronic circuits for controlling mechanical release mechanisms provided in accordance with the present invention. In a preferred embodiment, electronic circuits provide digital logic means for processing signals which are indicative of a condition in an outside environment and providing a trigger that will actuate the mechanical release mechanism in response to the condition. The circuits further comprise power means for providing regulated power to the electronic circuit in response to input power, the regulated power being used to operate the digital logic means. More preferably, the circuits comprise power backup means interfaced to the power means for providing the regulated power for a predetermined time in the event of an input power failure so that the digital logic means can be operated for a predetermined time during the input power failure.

It is further preferred that the electronic circuits comprise relay means interfaced with the digital logic means for receiving the trigger from the digital logic means to actuate the mechanical release mechanism in response to the condition, and more preferably, comprise power actuation means interfaced to the relay means for providing power to the relay means to actuate the mechanical release mechanism. In yet a further preferred embodiment, the power backup means is a capacitor having a capacitance value of about 22,000 microfarads. More preferably, the predetermined time that the power backup means provides regulated power is about 30 seconds.

In other aspects of the invention, a latch for a movable fire stop of a release mechanism in a fire control system is provided. The latch preferably comprises a metallic casing having geometrically regular proportions and an inside wall, a first opening adjacent the inside wall of the casing forming with the wall an open area in the form of a slot having dimensions adapted to receive a latch plate having dimensions such that its width is greater than its thickness, and its length is greater than its width.

More preferably, the latch comprises a second opening in the casing which intersects with a third opening in the form of a bore, one end of which bore terminates in one side of the first opening and outer end of which terminates below the intersection of the second opening with the third opening and adapted to contain a resilient member. In a preferred embodiment, the latch also comprises a latch pin mounted in the third opening at the end opposite the accommodation of the latch pin and below the intersection of the second opening with the third opening, the latch pin having a detent opening in one side. In an even further preferred embodiment, the latch comprises a body of resinous material adapted to be secured in the casing and having openings substantially conforming to the openings in the casings for securing the latch pin and resilient member in the casing.

The electronic circuits, latches, and fire control systems provided in accordance with the present invention are economical to produce and are highly reliable. Since these release mechanisms function for a predetermined time after power loss to the system, the use of release mechanisms provided in accordance with the present invention are safer than prior release mechanisms, since they do not cause the rolling door to close merely on the loss of power to the system. Furthermore, with the use of digital logic circuitry, the release mechanisms are highly reliable, do not utilize undue amounts of power for operation, and provide fail safe operation under all circumstances. Such results have not heretofore been achieved in the art.

The invention will be better understood by those with skill in the art by reading the following detailed description of preferred embodiments in conjunction with the drawings which are first described briefly below.

DETAILED DESCRIPTION OF PREFERRED EMBODIMENTS

Figure 1A:
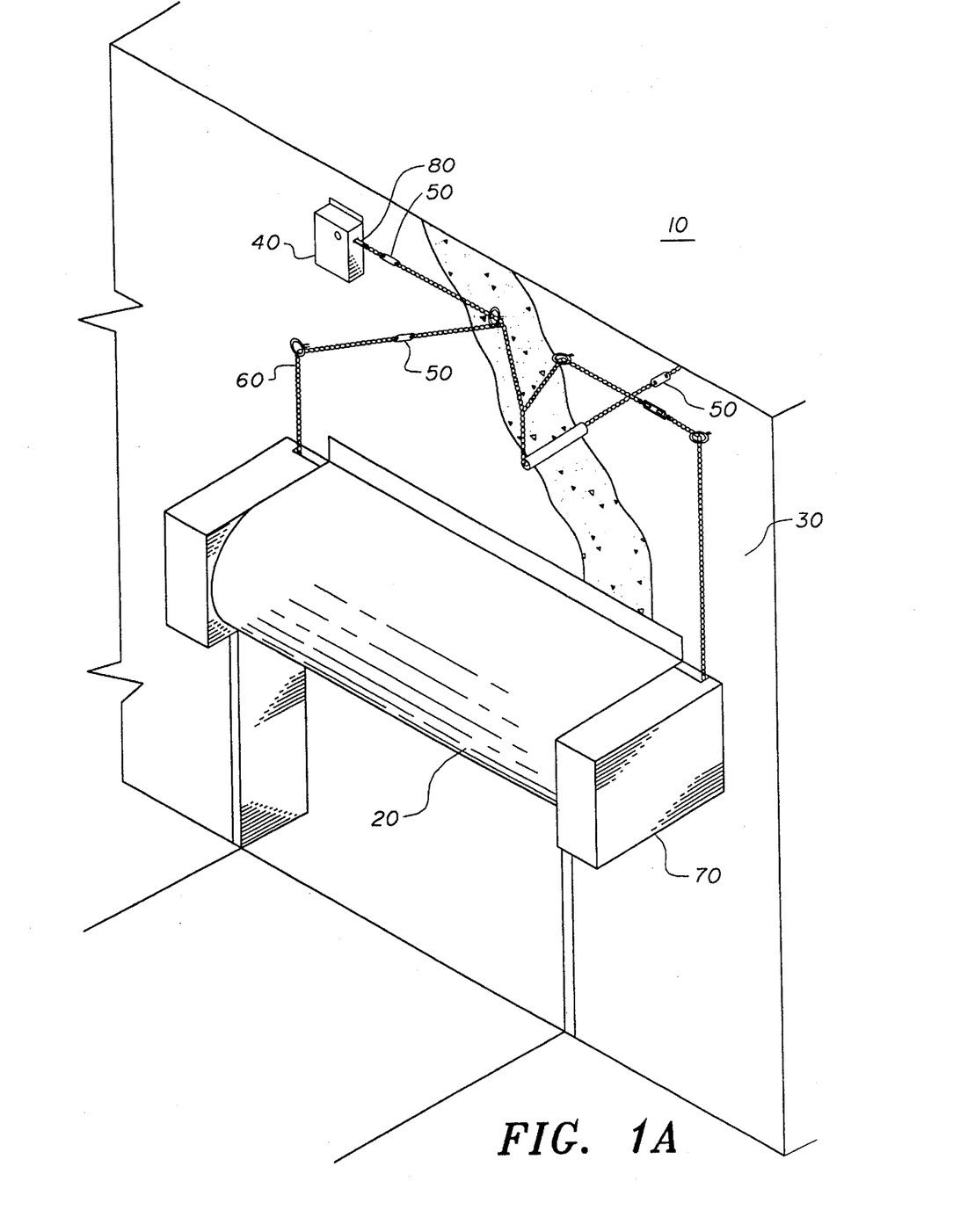
FIGS. 1A and 1B are schematic representations of a fire control system having a fusible link-chain subsystem interfaced with a release mechanism provided in accordance with the present invention.

Referring now to the drawings wherein like reference numerals refer to like elements, FIG. 1A shows a fire door control system 10 having a rolling fire door 20 with a fusible link-chain system 30 and a release mechanism 40. The fusible link-chain system 30 preferably comprises a series of fusible links 50 and a standard link-chain 60 which when under tension holds the door in the open position. A housing 70 contains the mechanical devices such as a detent wheel and axle, on which chain 60 is driven to operate the rolling door 20.

In operation of the system of FIG. 1A, when a fire or other catastrophic event occurs, the fusible links 50 melt thereby closing a circuit interfaced to release mechanism 40 which then causes the release mechanism 40 to be actuated and to release an end link 80. By releasing end link 80 the chain 60 is actuated by mechanical devices in housing 70 which causes the rolling fire door 20 to lower in response to the fire or other catastrophic condition. The fusible links 50 can be released by a signal being received from a smoke detector detecting a smoke condition, or by other conditions caused by catastrophic events which are sufficient to actuate the release mechanism 40.

Figure 1B:
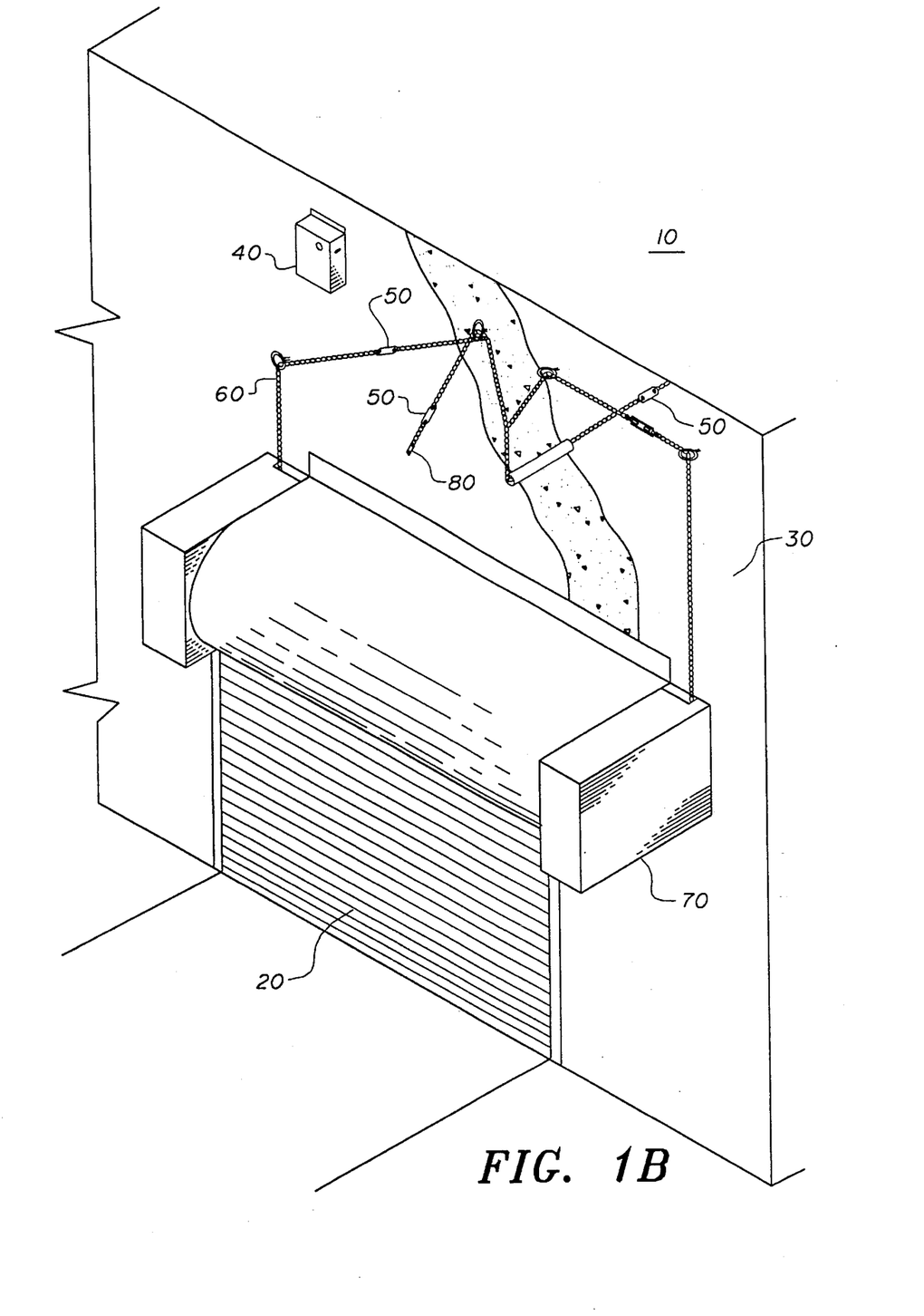

Referring to FIG. 1B, after the catastrophic condition has occurred and the fusible links have been activated such that the end link 80 has been released from the release mechanism 40, the rolling door 20 is driven to the closed position, thereby protecting the environment from the fire, smoke, or other condition which caused the release mechanism 40 to actuate. In this fashion, the release mechanism 40 ensures that the rolling door 20 will actuate at the proper time when a safety or alarm condition is sensed.

The release mechanism 40 is conventionally powered by "house" power in the facility in which the control system 10 is found. Thus, release mechanism 40 is usually wired to the 120 volt AC power line of the facility. However, it will be recognized by those with skill in the art that release mechanism 40 could be powered internally by a battery or other power energizing system contained within release mechanism 40.

Figure 2A:
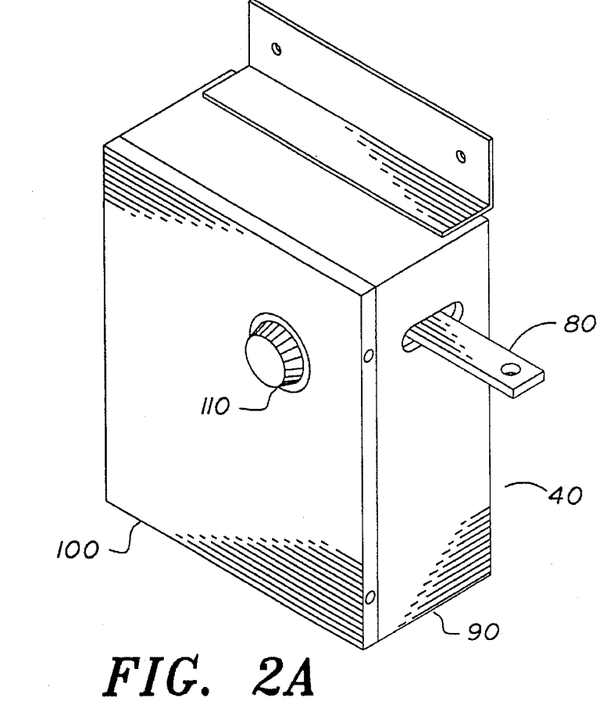
FIG. 2A shows a release mechanism of the present invention having an end link interfaced therewith.
Figure 2B:
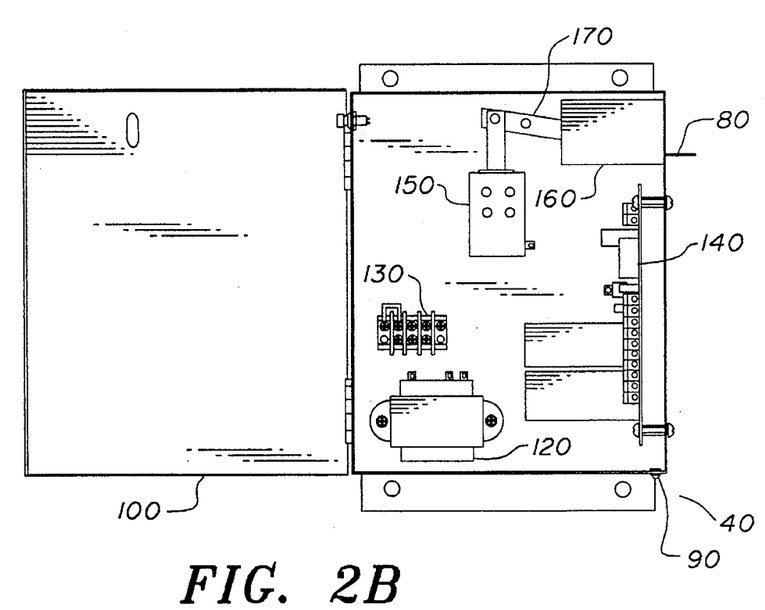
FIG. 2B shows the release mechanism of FIG. 2A wherein the housing of the release mechanism is open to expose the latch device and digital logic circuit which comprise the release mechanism.

Referring to FIGS. 2A and 2B, the release mechanism 40 comprises a housing 90 which houses the electronics and other devices which cause the end link 80 to be released upon sensing of the fire or other alarm condition. Optionally, housing 80 can comprise a hinged door 100 which protects the internal structure of release mechanism 40 and a reset button 110. In a preferred embodiment, the release mechanism 40 further comprises a transformer 120 interfaced to the 120 volt AC power supply found in the facility. A set of power lugs 130 allows power to be distributed throughout the release mechanism 40 to other devices in the release mechanism, or to the outside environment as needed.

An electronic circuit, shown generally at 140, comprises a printed circuit board or printed wiring board and along with electronic components that electronically control the operation of the release mechanism. Preferably, a solenoid 150 is electrically interfaced to the circuit board 140 for accepting an electrical trigger from the circuit board 140 that will actuate the release mechanism in response to the condition in the outside environment. Preferably, solenoid 150 is normally de-energized; that is, it is not under power before being actuated by the trigger event from the electronic circuit board 140.

Solenoid 150 is interfaced to a latch device, shown generally at 160, which is attached to the end link 80. The latch device comprises a lever arm 170 having two ends. Solenoid 150 is attached on a first end of the lever arm 170, and at the other end the lever arm is interfaced with the inner mechanisms of the latch. Upon receiving the trigger the solenoid is energized, thereby actuating the lever arm 170 which causes the latch 160 to release end link 80, to cause the rolling door 20 to traverse to the closed position.

Figure 3A:
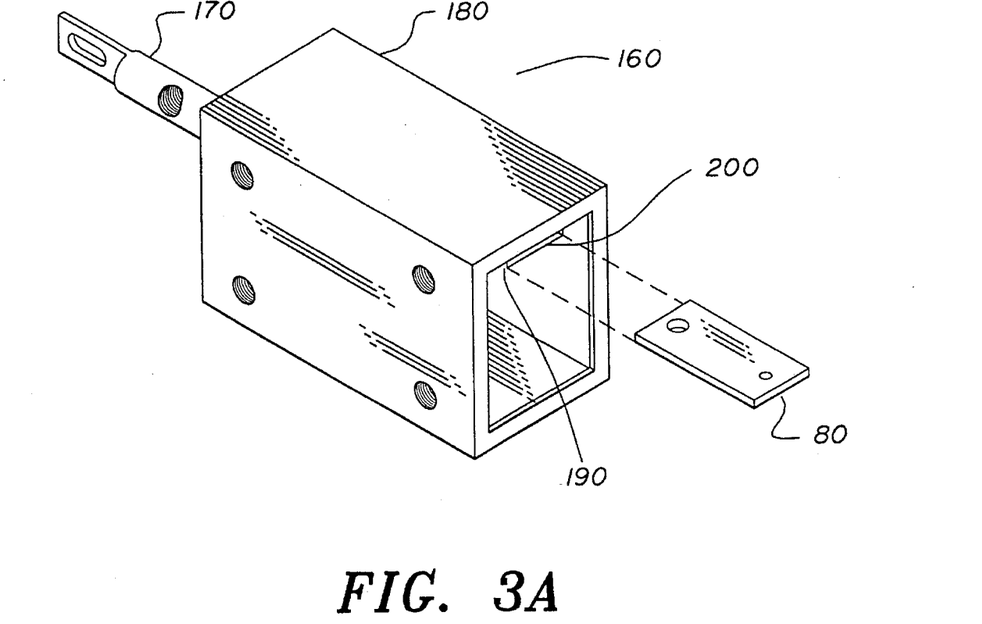
FIG. 3A is an isometric view of a latch device used with the release mechanism wherein the latch device has a lever arm and an end link.
Figure 3B:
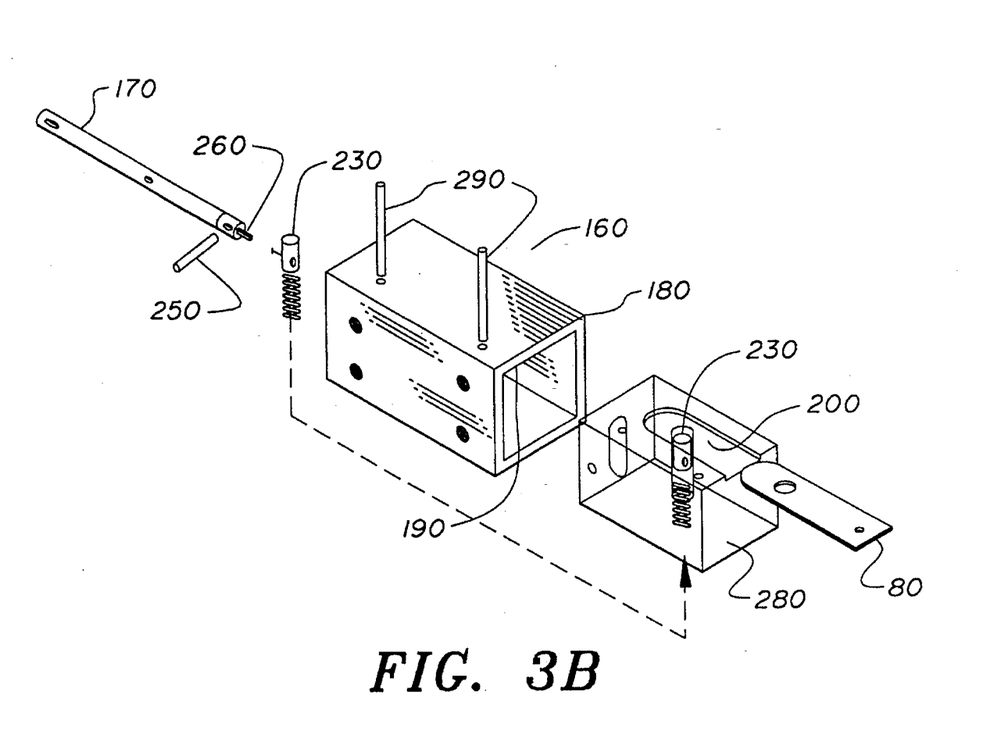
FIG. 3B is an exploded, isometric view of the latch device of FIG. 3A.

Referring to FIGS. 3A and 3B, the latch comprises an outer casing 180 having substantially, geometrically regular proportions and an inside wall 190. A first opening, shown generally at 200, adjacent the inside wall 190 forms an open area in the form of a slot which has dimensions that are adapted to receive the end link 80 which is sometimes called a "latch plate". Preferably, the latch plate 80 has dimensions such that the width of the latch plate is greater than the thickness, and the length of the latch plate is greater than the width.

Figure 4A:
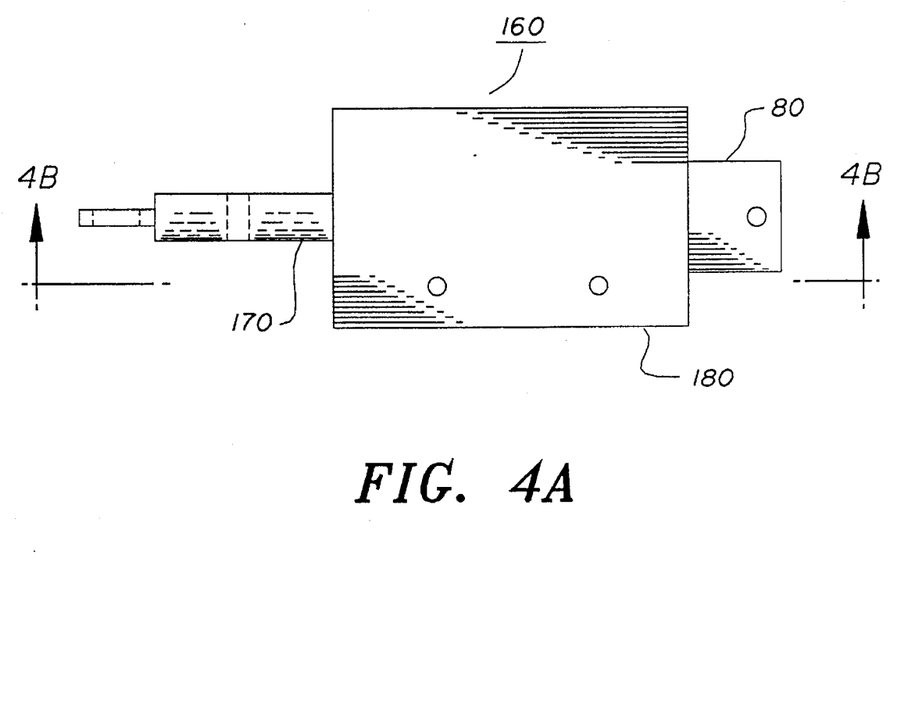
FIGS. 4A and 4B are respectively a plan and cross-sectional elevational view of a latch device used in the release mechanism of the present invention.
Figure 4B:
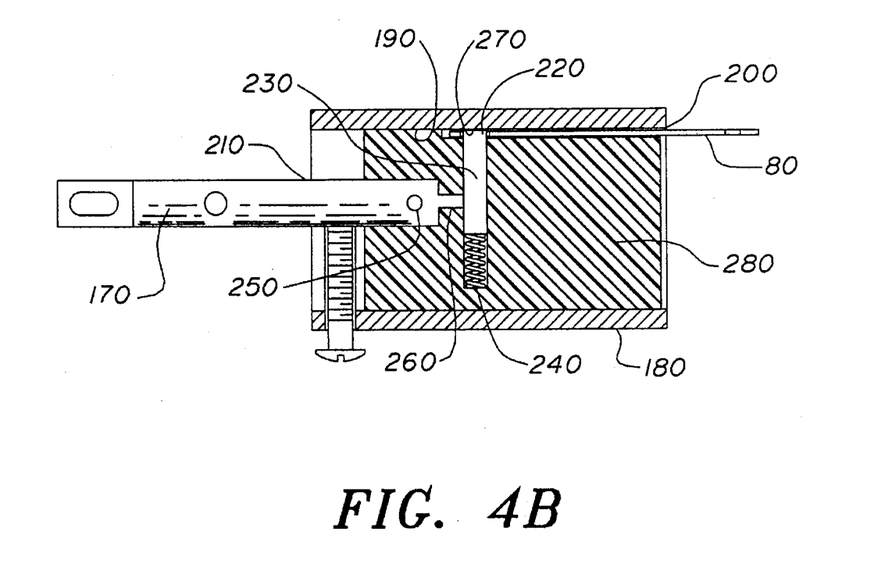

Referring to FIGS. 4A and 4B, a second opening 210 in casing 180 intersects with a third opening 220 which forms a bore through the latch 160. One end of bore 220 terminates in one side of the first opening 200 and the other end of bore 220 terminates below the intersection of the second opening 210 with the bore 220.

In a preferred embodiment, a latch pin 230 is mounted in the bore 220 at the end intersecting with the first opening 200. Even more preferably, a resilient member 240 is mounted in the bore 220 at the end opposite the accommodation of latch pin 230 below the intersection of the second opening 210 with the bore 220. More preferably, the resilient member 240 is a spring. In still a further preferred embodiment, the latch pin 230 comprises a detent opening in one side of the latch pin for interfacing with the lever arm 170.

In operation of the latch 160, the lever 170 accommodated in the second opening 210 releases end link 80 by pivoting on a pivot pin shown generally at 250. Yet more preferably, the lever 170 further comprises biasing means 260 at the end of the lever 170 for moving the end of the lever and by biasing the latch pin 230 against the resilient spring 240. The latch pin 230 is biased by the resilient spring 240 to extend from the bore 220 into the first opening 200 at the location at which the latch pin 230 is received in an opening in the latch plate 80 when the latch plate is accommodated in the first opening 200.

The latch 160 further comprises an adjustable stop 270 extending from the casing 180 into the first opening 200 to limit the passage of the latch pin 230 toward the casing 180. Preferably, the adjustable stop comprises a threaded member which is threaded through the casing 180.

In yet a further preferred aspect of the invention, the latch 160 comprises a body of resinous material, shown generally at 280, which is adapted to be secured in casing 180. The resinous body 280 has openings which substantially conform to the first, second and third openings in the casing for securing the latch pin and resilient member in the casing and also for accommodating the lever 170. In a preferred embodiment, the resinous material is a plastic material having a sufficiently high coefficient of friction to allow the moving parts of latch 160 to smoothly and easily operate. The purpose of the resinous material 280 is to hold the mechanical components of latch 160 within the casing and to allow the moving parts in the casing to traverse therein with ease and efficiency. The resinous material is preferably a high density polymer material having an ultra high molecular weight ("UHMW") which can be machined to form the various openings required therein and which can be conformed to the shape of the casing 180 comprising the latch 160.

Figure 5A:
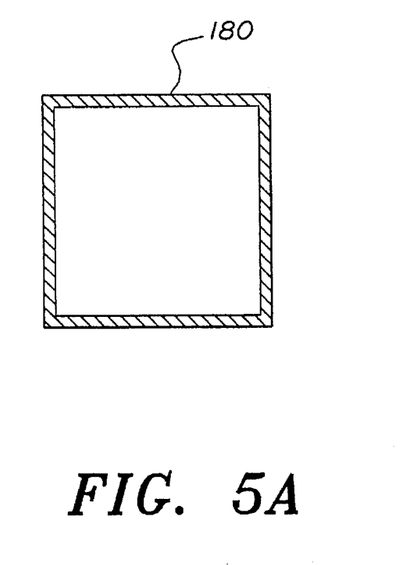
FIGS. 5A through 5D are cross-sectional views of an ultra high molecular weight resinous body used in the latch device for holding the components of the latch device together.
Figure 5B:
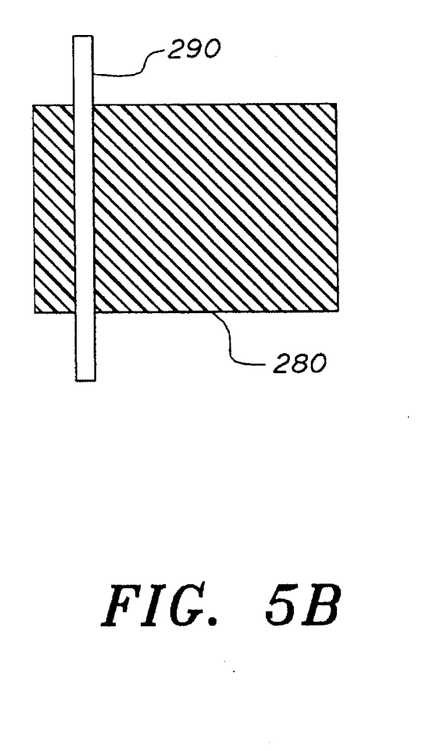
Figure 5C:
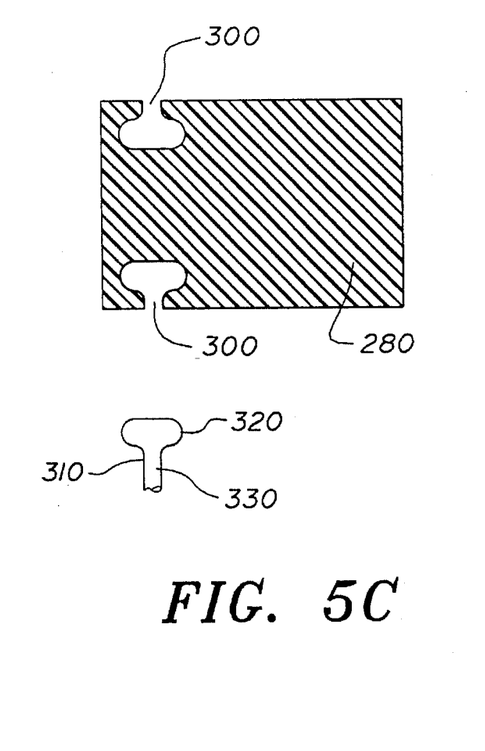

Referring to FIGS. 5A through 5D, alternative embodiments for securing the block of resinous material 280 within housing 180 are illustrated. The casing 180 shown in FIG. 5A is preferably made of aluminum. In a preferred embodiment, a ⅛ inch dowel 290 anchors the resinous material 280 to the casing. The UHMW polymer block 280 can be drilled so that dowel 290 can be passed therethrough to anchor the UHMW block 280 to housing 180. Alternatively shown in FIG. 5C, anchoring slots 300 can be machined from UHMW block 280 such that a ball or knob pin, shown generally at 310, can be anchored within the openings 300. The head 320 of knob pin 310 is adapted to be anchored in the UHMW block 280, while the shaft 330 secures UHMW block 280 to housing 180.

Figure 5D:
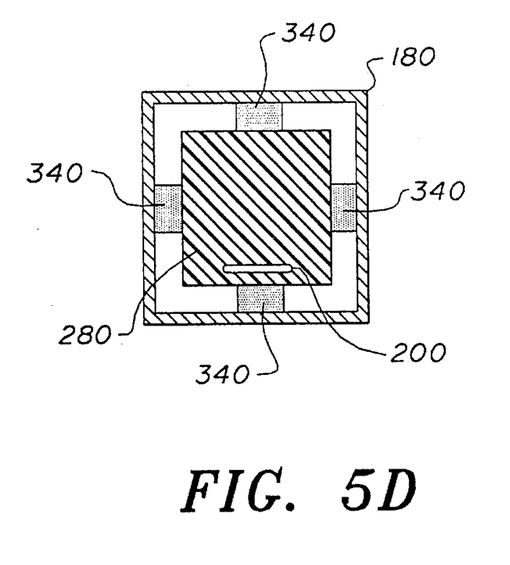

In yet a further preferred embodiment shown in FIG. 5D, a series of high density polystyrene foam shims 340 can be placed between UHMW block 280 and housing 180 to frictionally hold UHMW block 280 within housing 180.

The electronic control circuitry of the present invention provides efficient means whereby fire protection can be realized using grills, counter shutters, sectional doors, counter doors, and rolling and swinging fire doors beyond that afforded by simple temperature fuse links, or passive multiple component electromagnetic devices found in prior systems. The electronic circuitry of the present invention also provides fail safe release device action according to current Underwriter Laboratory standards and provides releasing action as dictated by appropriate automatic or manually activated fire system signalling equipment.

Figure 6:
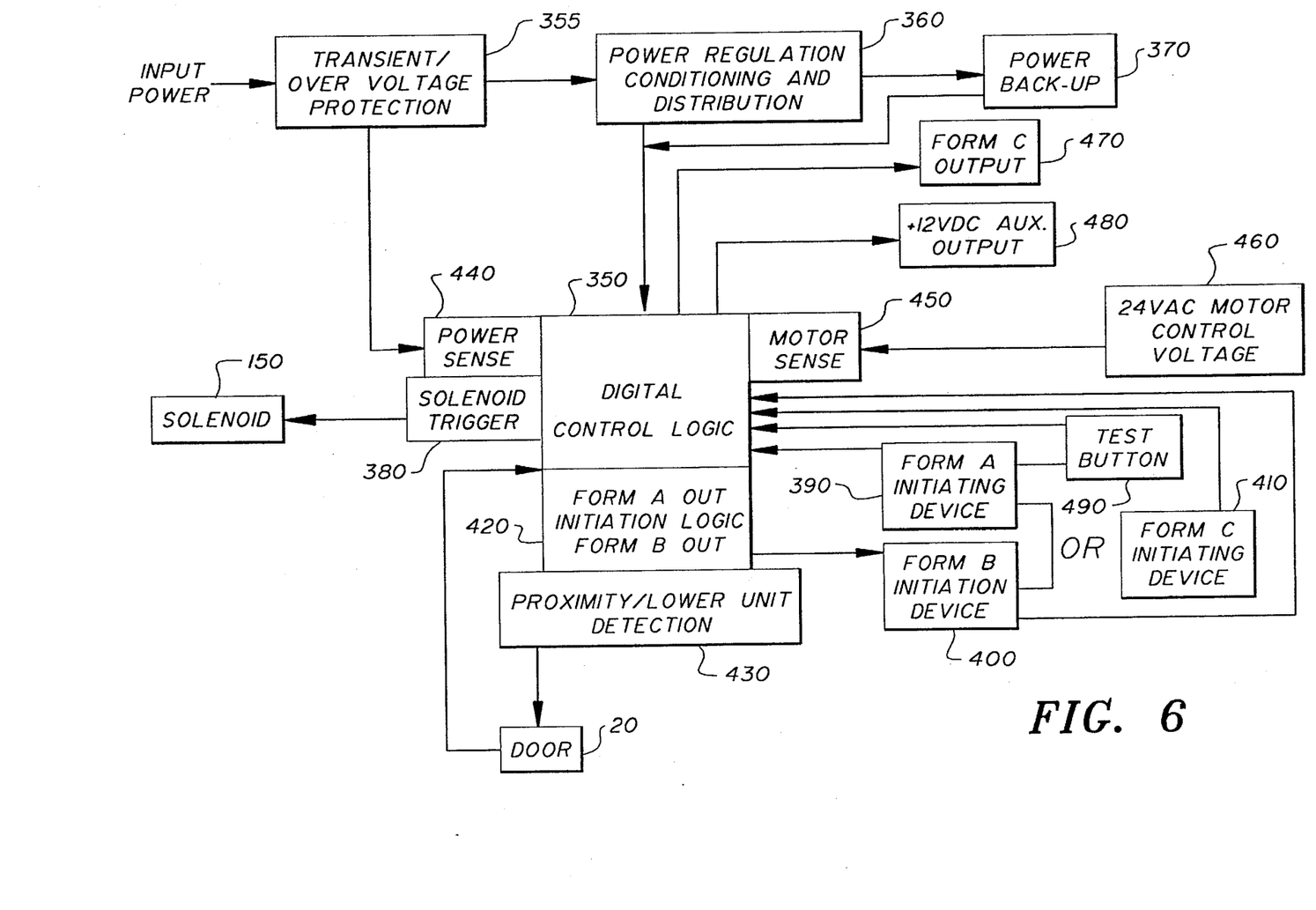
FIG. 6 is a functional block diagram of the digital logic board which comprises the release mechanism provided in accordance with the present invention.

Referring to FIG. 6, in accordance with the invention the electronic circuit 140 comprises a digital control logic block 350 which preferably utilizes discrete CMOS circuit elements for forming the various logic functions required to operate the release mechanism. More preferably, input power is received from the AC line or battery through a transient/overvoltage protection circuit 355. The voltage which is output from transient/overvoltage protection circuit 355 is input to a power regulation, conditioning and distribution network 360 which conditions the voltage so that the digital control logic block 350 can be run with reliability and accuracy.

In accordance with the present invention, power backup circuit 370 is interfaced with the power regulation, conditioning and distribution circuit 360 to provide the regulated voltage to digital control logic block 350 in the event that the input power is lost.

A solenoid trigger power actuation circuit 380 is interfaced to digital control logic block 350 which will trigger the solenoid 150 when the digital control logic block 350 senses an alarm condition due to a fire or other catastrophic emergency. Digital control logic 350 preferably comprises fused diode gated and protected inputs which are interfaced to Form A and Form B initiating devices shown generally at 390 and 400 respectively, as well as a Form C initiating device 410.

The Form A, Form B and Form C initiating devices are triggered through initiation logic 420 which is directly interfaced to the digital logic block 350. Additionally, a proximity/lower door closure unit 430 provides limit sensing contacts for door 20 and provides feedback to the digital control logic block 350 so that the status of the position of the door before, during and after the emergency condition can be sensed by digital control logic block 350. The Form A, Form B, and Form C initiating devices along with the proximity/lower unit protection block 430 perform status processing functions for the electronic circuit of the present invention to control operation of the fire protection system.

More preferably, digital logic block 350 is interfaced to a power sensing circuit 440 which senses whether power is present through the transient/overprotection block 355. If the power is not present, the digital control logic block 350 will output an alarm signal which can be detected by personnel in the outside environment of the fire control system. Additionally, motor sense circuity 450 is interfaced with digital control logic block 350 to determine whether a motor which drives the door 20 is properly functioning.

The motor sense circuitry is further preferably interfaced with a 24-volt AC motor control voltage block 460 through which the motor control voltage is input. In still a further preferred embodiment, the fire control system comprises a Form C output block 470 which can interface with a Form C output device and a 12-volt DC auxiliary output block 480 that provides 12 volts auxiliary voltage for use off-board. Additionally, a test button 490 is interfaced with the digital control logic block 350 to provide manual testing of the Form A, Form B, or Form C initiating devices.

Figure 7A:
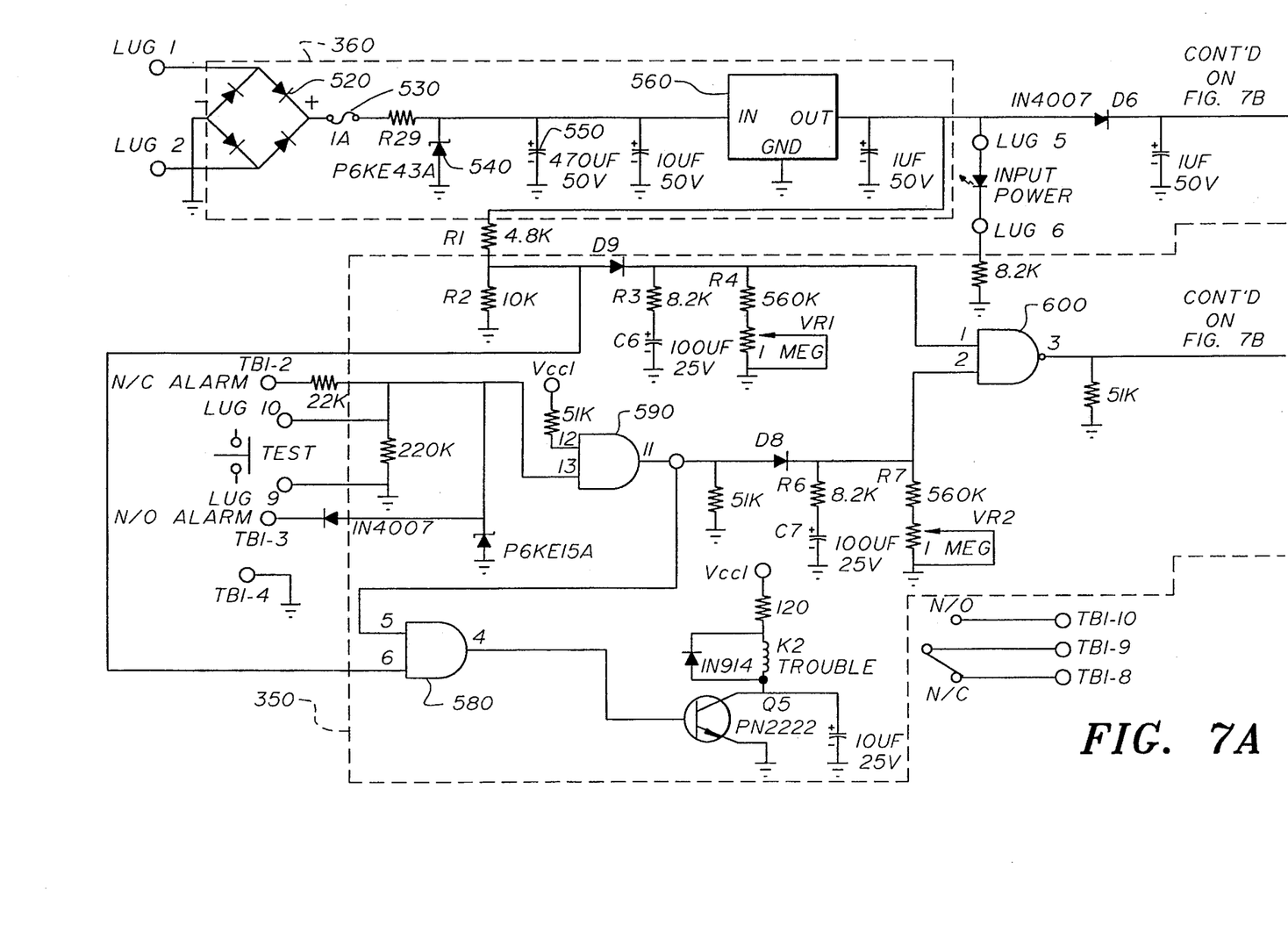
FIGS. 7A and 7B are a schematic of a preferred embodiment of the digital logic board provided in accordance with the present invention.
Figure 7B:
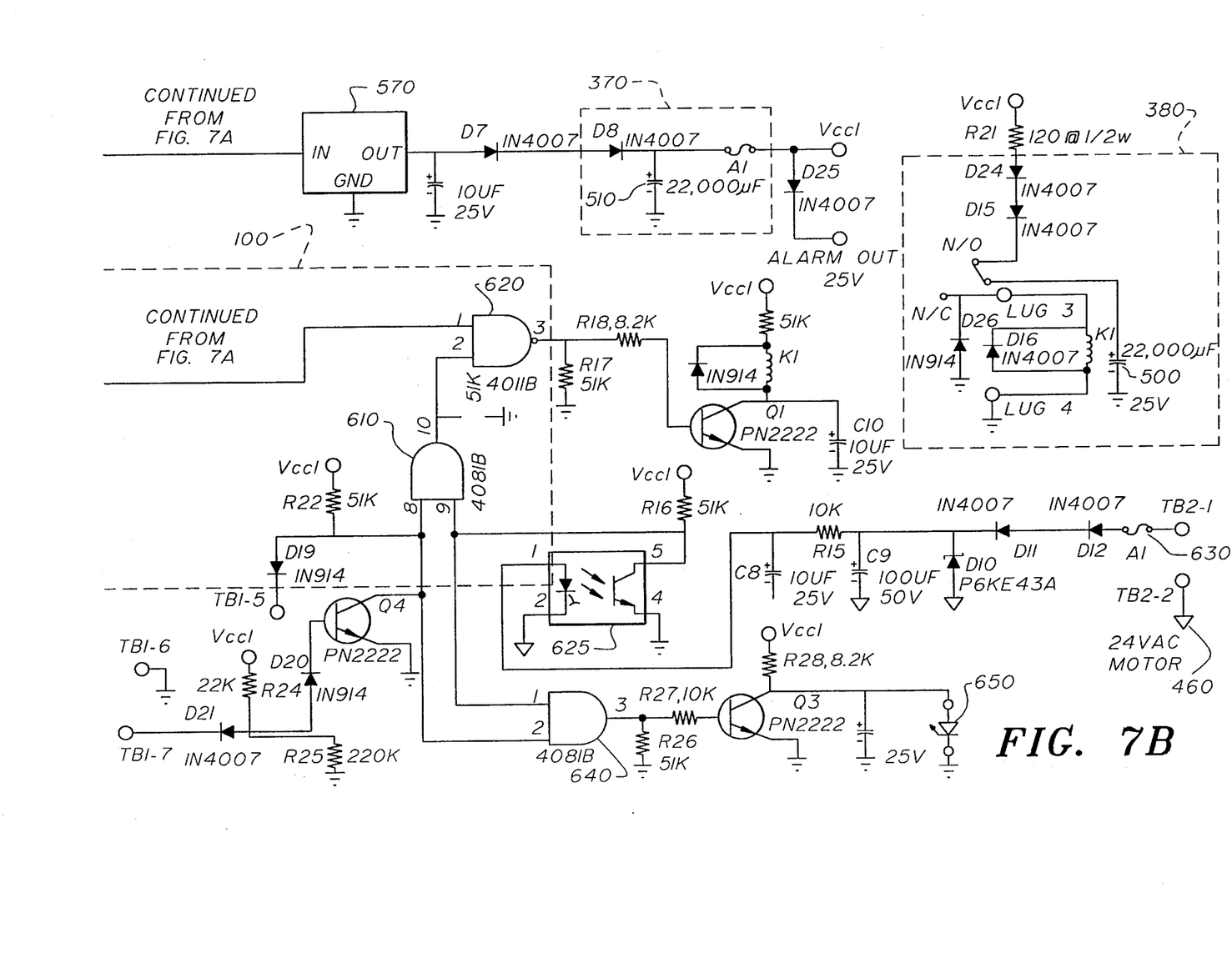

The electronic circuit 140 which controls the mechanical release mechanism of the present invention is shown schematically in FIGS. 7A and 7B. In a preferred embodiment, digital block 350 contains digital circuit elements that process signals which are indicative of a condition, such as a fire, in an outside environment. The digital circuitry of block 350 thereby provides triggering signals that will actuate the mechanical release mechanism of the present invention in response to an alarm event induced by an alarm condition.

It is desired to provide regulated power to the electronic circuit so that the digital circuitry of block 350 can be run with reliability and accuracy. To accomplish this goal, input power is provided to the regulated power block 360 which outputs regulated power to the digital circuit block 350. The regulated power is shown on the circuit diagram of FIGS. 7A and 7B as $V_{cc1}$ which is preferably a regulated DC voltage level of about 15 volts DC.

In accordance with the present invention, the electronic circuit of FIGS. 7A and 7B is fail-safe and can operate in the event of power failure to the system. To accomplish this result, power backup circuit 370 is provided to the electronic circuit. The power backup circuit 370 is interfaced to the regulated voltage supply 360 and will provide regulated power for a predetermined time in the event of an input power failure. By assuring that the regulated power is present for a predetermined time in the event of input power failure, the digital block 350 will continue to operate for the predetermined time during the input power failure so that the mechanical release mechanism will perform the job of releasing the fire door during a fire emergency.

In a further preferred embodiment, the circuit of FIGS. 7A and 7B is interfaced with solenoid 150 that releases an end latch of the mechanical release mechanism when a signal is received from the circuit. To further ensure that the device of the present invention is fail-safe, power actuation circuit 380 is provided to actuate the solenoid when a triggering signal is received from the digital block 350. The power actuation circuit 380 comprises a relay, shown as K1, which is in the "normally open" position during circuit operation.

In the event of an alarm condition, relay K2 of digital block 350 which is "normally closed" interfaces a signal to relay K1 to throw the normally open switch to the normally closed position, thereby providing a ground path between the power capacitor 500 in the power actuation block 380 through the relay K1. Discharge of the power capacitor 500 through relay K1 causes the solenoid to release the end link 80 in the release mechanism so that the fire door can be closed by appropriate mechanical apparatus in the system. The power capacitor 500 is preferably a 22,000 microfarad capacitor which is continuously charged through $V_{cc1}$ during circuit operation.

In yet a further preferred embodiment, the power backup block 370 comprises a similar 22,000 microfarad power backup capacitor 510 which is continuously charged by regulated power supply 360. In the event of power failure, the power backup capacitor provides power to the digital logic block 350 for about 30 seconds so that power is available to the logic circuitry for operation during power failure. This allows the power actuation capacitor to discharge through relay K1 when relay K2 receives an alarm from the powered digital logic block 350.

More preferably, power is supplied to the power regulation conditioning and distribution network 360 directly through lugs 1 and 2. If 24-volt AC or 24-volt DC power is applied, the power can be applied directly to the network. However, if 120-volt power is applied, it is first conditioned through the transformer 120 which is preferably a 6-1 stepdown transformer. Diode bridge 520 provides full wave rectification for AC input power. For DC input voltage, three of the four diodes are removed, and one of the diodes is installed as a diode switch with a bus short to provide circuit ground.

Input protection is provided by a ¾ amp fast blow fuse 530 in combination with resistor R29, zener diode 540 and the 470 microfarad, 50-volt capacitor shown at 550. A surge limiting resistor, R29, reduces electrical stress on the diode bridge 520 and capacitor 540 and decreases the effects of line and lead inductance, thereby optimizing the response of the transient voltage suppression diode 540. Capacitor 550 functions primarily to filter rectified voltage provided by the diode bridge 520. Integrated circuit 560 is preferably a 7820 timer and provides a regulated 20 volts DC to the second integrated circuit 570, preferably a 7815 timer. Integrated circuit 570 provides a regulated 15-volt system voltage, $V_{cc1}$.

Diode D8 is a switch which prevents the power backup capacitor 510 from discharging through its normal charge path. This accounts for the ability of the circuit of FIGS. 7A and 7B to monitor and process alarm signals during short periods of acute power loss and brown-out conditions. Backup capacitor 510 provides a capacitive type of power support to the CMOS logic devices and ultrasensitive relays which are utilized in the circuit. Diode D25 provides protection against positive going transients and further provides an auxiliary supply output of approximately 4.4 volts DC for use with equipment such as close proximity smoke detectors and dedicated release devices.

Diode D16, found in the solenoid trigger circuit 380 in a preferred embodiment provides a voltage source for the normally closed Form B alarm processing loop. Also in the solenoid trigger circuit 380, diodes D24, D15 and resistor R21 charge power capacitor 500 through relay K1 so that power can be sourced through the chassis-mounted solenoid 150 (shown off-board in the circuit diagram of FIGS. 7A and 7B) under an alarm condition. In accordance with the present invention, an "alarm" is defined as about a 1 to 10 second time period after an alarm-out loop interruption is sensed, or a loss of input power from about a 1 to 30 second time period. These two delay periods are verification delays, and can be adjusted in the circuit by variable resistors VR1 and VR2 in accordance with the invention.

Resistors R1 and R2 comprise a voltage-dividing network that provides input power to the digital control logic block 350. The power is provided to AND gate 580 at pin 6. Preferably, pin 5 of AND gate 580 is the input for a fire alarm status through pin 11 of second AND gate 590. The output, pin 4, of AND gate 580 drives the base of transistor Q5 which switches the trouble detection relay K2. In this fashion, lugs TB1-8, TB1-9, and TB1-10 provide the Form C contacts out for the auxiliary trouble/alarm switching signals received from relay K2.

In a more preferred embodiment, diode D9 in combination with resistors R3 and R4, capacitor C6 and VR1 provide an input to integrated circuit 600 which in a further preferred embodiment is a Schmitt trigger NAND gate. This combination provides a power loss processing loop for the digital control logic block 350. Schmitt trigger 600 provides a reliable logic transition in response to a slow change in the power loss timing input. Similarly, diode D8 in combination with resistors R6, R7, capacitor C7 and VR2 provide input to Schmitt trigger 600 at pin 2 to control process alarm loop signals in a reliable fashion.

The combination of diodes D21, D12, D24, resistors R24, R25, R22, transistor Q4 and integrated circuit 610 (also a 4081B AND gate) comprise the proximity/lower unit detection block 430 of circuit 140. This combination provides a status processing function of external lower limit door contacts at a normally open or normally closed set of switches. When the door 20 is in a closed position and the appropriate inputs are connected to the lower limit detection unit 430, AND gate 610 drives pin 3 of NAND gate 620 low which thereby inhibits the release mechanism. This prevents the releasing mechanism from attempting to lower a previously closed door and eliminates the concern of damaging the door and motor controls.

When the door 20 is an automated motorized door, gate 620, integrated circuit 625, resistors R16 and R15, capacitors C8 and C9, and diodes D10, D11, and D12, along with fuse 630, form the 24-volt AC motor control circuit 460 which prevents closure of the door by the release mechanism if the motor control secondary winding voltage is present. The sample voltage from the motor control circuitry 460 is introduced to the motor sense processing logic via the two lugs TB2-1 and TB2-2. When this voltage is present, the release mechanism of the present invention will allow the automated door 20 to close by motorized means. In the absence of the secondary voltage, closure will be initiated by the release device exclusively.

In a further preferred aspect of the invention, AND gate 640 resistors R26, R27, and R28, transistor Q3, and light emitting diode 650, comprise the motor sense circuit 450 which provides an enable or disable indicator for both the motor sense circuit 450 and door edge/lower limit protection unit 430. If either circuit 430 or circuit 450 is active, LED 650 will be illuminated.

Finally, the Schmitt trigger NAND gate 620, resistors R17, R18, capacitors C10 and the actuation capacitor 500 trigger the solenoid through relay K1 in the event of an alarm, power loss, or other catastrophic failure of the control logic circuitry. This provides a fail safe mode for the release device in full compliance with all regulatory requirements and standards.

Thus, the fire control systems, release mechanisms, and electronic circuitry provided in accordance with the present invention incorporate state-of-the-art electronic control, and provide maximum fire protection under all circumstances. Circuits described herein can be used alone or in conjunction with integrated, fused link systems and provide power loss backup and supervisory support to a release device in a fire control system. Furthermore, the special diagnostic capabilities provided by circuits claimed and described herein, such as door edge sensing and motor control monitoring, ensure that fire control systems will function in the event of any catastrophic event which provides an alarm to the system. Such results have not heretofore been achieved in the fire control art.

There have thus been described certain preferred embodiments of electronic control systems provided in accordance with the present invention. While preferred embodiments have been described and disclosed, it will be recognized by those with skill in the art that modifications are within the true spirit and scope of the invention. The appended claims are intended to cover all such modifications.

What is claimed is:

1. An electronic circuit for controlling a mechanical release mechanism for a rolling fire door comprising:

a mechanical release mechanism for releasing the rolling fire door when a condition in an outside environment requires that the door be released;

digital logic means for processing signals which are indicative of the condition in the outside environment and for providing a trigger that will actuate the mechanical release mechanism in response to the condition, thereby releasing the rolling fire door;

power means for providing regulated power to the electronic circuit in response to input power, the regulated power being used to operate the digital logic means; and power backup means interfaced to the power means for providing the regulated power for a predetermined time to the digital logic means in the event of an input power failure so that the digital logic means can be operated for the predetermined time during the input power failure and so that the fire door can be released in response to the condition in the absence of input power.

2. The electronic circuit recited in claim 1 further comprising relay means interfaced with the digital logic means for receiving the trigger from the digital logic means to actuate the mechanical release mechanism in response to the condition.

3. The electronic circuit recited in claim 2 further comprising power actuation means interfaced to the relay means for providing power to the relay means to actuate the mechanical release mechanism.

4. The electronic circuit recited in claim 3 wherein the power backup means is a capacitor.

5. The electronic circuit recited in claim 4 wherein the power backup capacitor has a capacitance value of about 22,000 microfarads.

6. The electronic circuit recited in claim 5 wherein the power activation means is a capacitor.

7. The electronic circuit recited in claim 6 wherein the power activation capacitor has a capacitance value of about 22,000 microfarads.

8. The electronic circuit recited in claim 7 wherein the predetermined time is about 30 seconds.

* * * * *